(12) United States Patent
Ikeda et al.

(10) Patent No.: US 6,505,195 B1
(45) Date of Patent: Jan. 7, 2003

(54) CLASSIFICATION OF RETRIEVABLE DOCUMENTS ACCORDING TO TYPES OF ATTRIBUTE ELEMENTS

(75) Inventors: Takahiro Ikeda, Tokyo (JP); Kenji Satoh, Tokyo (JP); Akitoshi Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 09/587,358

(22) Filed: Jun. 2, 2000

(30) Foreign Application Priority Data

Jun. 3, 1999 (JP) .......................................... 11-156423

(51) Int. Cl.[7] .............................................. G06F 17/30
(52) U.S. Cl. ................................................ 707/3; 707/5
(58) Field of Search ............................... 707/2, 3, 5, 6, 707/101, 104.1, 501.1, 514, 522, 531; 704/9; 705/7

(56) References Cited

U.S. PATENT DOCUMENTS

| | | | | |
|---|---|---|---|---|
| 5,943,443 A | * | 8/1999 | Itonori et al. | 358/403 |
| 6,009,439 A | | 12/1999 | Shimoi et al. | 707/104.1 |
| 6,233,575 B1 | * | 5/2001 | Agrawal et al. | 706/12 |
| 6,243,723 B1 | * | 6/2001 | Ikeda et al. | 707/3 |
| 6,393,427 B1 | * | 5/2002 | Vu et al. | 707/100 |

FOREIGN PATENT DOCUMENTS

| | | |
|---|---|---|
| JP | 4-190423 | 7/1992 |
| JP | 7-319905 A | 12/1995 |
| JP | 8-235160 A | 9/1996 |
| JP | 9-231238 | 9/1997 |
| JP | 10-83400 A | 3/1998 |
| JP | 10-283366 A | 10/1998 |
| JP | 10-293762 | 11/1998 |
| JP | 10-320441 A | 12/1998 |

\* cited by examiner

Primary Examiner—Diane D. Mizrahi
Assistant Examiner—Apu M. Mofiz
(74) Attorney, Agent, or Firm—Foley & Lardner (57) ABSTRACT

A document storage stores a plurality of documents belonging to a certain field. The administrator of a host device uses a classification attribute selector to select the types of attributes suitable for classifying the documents stored in the document storage, from the types of attributes which are stored in a candidate storage and can be used as classification keys, and stores the selected types of attributes in a classification attribute storage. An attribute analyzer analyzes each of documents retrieved by a document retriever to determine which one of the types of attributes stored in the classification attribute storage an attribute element contained in the document belongs to. An attribute classifier classifies each of the retrieved documents into a category according to the type of the attribute element contained in the document based on the determined type of an attribute from the attribute analyzer.

18 Claims, 8 Drawing Sheets

ROAST MEAT RESTAURANT "XX"

WE ARE CELEBRATING 1ST ANNIVERSARY OF THE
OPENING OF OUR RESTAURANT THANKS TO YOUR
PATRONAGE. WE ARE OFFERING YOU AS MUCH ROAST
AS YOU WANT AT 3,000 YEN AS SPECIAL 1ST
ANNIVERSARY PRICE.

SHIBUYA BRANCH: 1-2-3, xx, SHIBUYA WARD, TOKYO

Fig. 3B

OUR SCHOOL FESTIVAL IS NOW OVER AND WE HAVE
CLOSED IT WITH PARTY. WE HAVE BEEN TO ROAST
MEAT RESTAURANT "YY". SINCE WE HAVE BEEN
OFFERED AS MUCH AS ROAST MEAT AS WE WANT, WE
HAVE HAD ENOUGH OF IT AND GAINED WEIGHT.

Fig. 3C

INFORMATION ON EATING IN KANSAI AREA

TODAY'S RESTAURANT IS ROAST MEAT RESTAURANT
"ZZ" AT TSURUHASHI. THE RESTAURANT OFFERS
TASTY MEAT AND ALSO THE PRICE IS REASONABLE
BECAUSE YOU PAY 2,000 YEN AT MOST WHEN YOU EAT
UNTIL YOU FEEL STUFFED.

Fig. 3D

WELCOME TO THE HOMEPAGE OF ROAST MEAT
RESTAURANT "AA". YOU CAN HAVE AS MUCH QUALITY
DOMESTIC BEEF MEAT AS YOU WANT.

2-4-6, XX, SAKAI CITY, OSAKA DISTRICT
0722-XX-XXXX
YOU CAN EAT AS MUCH MEAT AS YOU WANT FOR 90
MINUTES AT 2,500 YEN.
LUNCH TIME 11:00 TO 14:00 ON WEEKDAYS 60
MINUTES AT 1,500 YEN

Fig. 3E

INTRODUCING: ROAST MEAT RESTAURANT "BB",
           KANNAI BRANCH
ADDRESS: 7-8-9, XX, NISHI WARD, YOKOHAMA CITY,
         KANAGAWA PREFECTURE
LOCATION: 10-MINUTE WALK FROM KANNAI STATION
COMMENT: THE MEAT WAS DELICIOUS. I ALSO
         RECOMMEND BIBINBA.

Fig. 3F

RESTAURANT INFORMATION
YOU CAN HAVE DOMESTIC BEEF MEAT AT REASONABLE
PRICE IN THIS ROAST MEAT RESTAURANT.
ROAST MEAT RESTAURANT "XX"
1-3-5, XX, TAKATSUKI CITY, OSAKA DISTRICT
BUSINESS HOURS: 17:00 - 23:00
                      (CLOSED ON THURSDAYS)

Fig. 3G

THIS MONTH'S FIRST RECOMMENDATION
ROAST MEAT RESTAURANT "XX", SANJO BRANCH
XXXX, HIGASHIYAMA WARD, KYOTO CITY,
KYOTO DISTRICT
075-xxx-xxxxx

Fig. 3H

MY PROFILE
NAME: XX XXX
SEX: MALE
AGE: 22
BLOOD TYPE: O
FAVORITE FOOD: ROAST MEAT

Fig. 3I

COLLECTION OF SPECIAL CUISINE RECIPES

MENU NO. 32 : SALAD OF RADISH AND ROAST MEAT
INGREDIENTS (FOR FOUR PEOPLE)
BEEF: 400 G
RADISH : ONE HALF

Fig. 3J

METROPOLIS AREA: THREE BEST RESTAURANTS WITH
                 WITH TASTY ROAST MEAT
RESTAURANT "ABC": 1-3-5, XX, TAITO WARD, TOKYO
                  METROPOLIS NEARBY STATION:UENO
RESTAURANT "DEF": 2-4-6, XX, MINATO WARD, TOKYO
                  METROPOLIS NEARBY STATION:SHINBASHI
ROAST MEAT "GHI": 3-6-9, XX, KAWASAKI WARD, KAWASAKI
                  CITY NEARBY STATION: KAWASAKI

Level 0      Level 1      Level 2

CLASSIFICATION OF RETRIEVABLE DOCUMENTS ACCORDING TO TYPES OF ATTRIBUTE ELEMENTS

BACKGROUND OF THE INVENTION

1. Field of the Invention

The present invention relates to a method of and an apparatus for retrieving documents matching an indicated condition from a large number of documents.

2. Description of the Related Art

According to one conventional document retrieval process, documents that contain all or some of entered keywords are retrieved from a large number of documents. This document retrieval process is provided as services for retrieving various documents that are available in the Internet or personal computer communication services, and also as software for retrieving documents stored in a hard disk. However, entering a keyword or keywords to indicate a retrieving condition is not effective enough to narrow a large number of documents down to only those documents which the user wants to have, and is disadvantageous in that the retrieved documents tend to include many documents which match the condition but do not meet the user's needs. Although some services for retrieving various documents that are available in the Internet allow the user to add a keyword or keywords to further narrow down the retrieved documents, they fail to completely eliminate unwanted documents.

To solve the above problems, there have been proposed processes for classifying retrieved documents according to other factors than keywords and presenting classified documents to the user. For example, Japanese laid-open patent publications Nos. 8-235160 and 9-231238 disclose processes for classifying retrieved documents.

Specifically, Japanese laid-open patent publication No. 8-235160 discloses a method of and an apparatus for retrieving documents. According to the disclosed method and apparatus, if the number of retrieved documents is greater than a preset value, the retrieved documents are classified according to attribute data such as document names, document registration dates, etc. assigned to the documents, and the classified documents are presented to the user.

Japanese laid-open patent publication No. 9-231238 discloses a method of and an apparatus for displaying retrieved texts. According to the disclosed method and apparatus, the subjects of retrieved texts are analyzed and divided into a plurality of groups, so that the texts are classified and displayed.

A process for classifying a plurality of documents, disclosed in Japanese laid-open patent publication No. 10-320411, extracts keywords with 5W1H attributes from documents, and classifies the documents into a two-dimensional matrix with the extracted keywords with 5W1H attributes.

However, the above document retrieving processes often fail to narrow documents down to suitable documents for the user or to provide suitably classified documents.

For example, it is assumed that the user who wishes to stay in "X hotel" tries to retrieve documents containing a keyword "X hotel" in order to obtain information necessary to stay in "X hotel". The information required by the user includes the contact information of "X hotel" and the address of "X hotel", and the documents which are required by the user are documents containing the required information. However, only the condition that the keyword "X hotel" be included in documents is not specific enough to narrow a large number of documents down to only those documents which contain the contact information of "X hotel" and the address of "X hotel". For example, documents retrieved under the above condition may include a document containing a news reporting that a new product has been presented in the X hotel and a Web document resembling a diary which states that someone enjoyed a dinner at a restaurant in the X hotel, though these documents are not required by the user. Since the condition that the contact information and the address be included in documents cannot be expressed by keywords, it is impossible to limit retrieved documents and exclude unwanted documents by adding a keyword or keywords.

With the method of and the apparatus for retrieving documents disclosed in Japanese laid-open patent publication No. 8-235160, retrieved documents can be classified according to attributes assigned to the documents. Therefore, attributes necessary to classify documents need to be assigned to the documents in advance. Unless information about the contact information and the address is recorded as attributes of documents, the retrieved documents cannot be classified into documents with the contact information and the address and documents without the contact information and the address. In particular, it is difficult for the disclosed system to deal with Web documents available in the Internet.

According to the disclosed method and apparatus of Japanese laid-open patent publication No. 9-231238, the retrieved texts are classified according to their subjects into those texts with the subjects containing information as to the contact information and the address and those texts with the subjects containing no information as to the contact information and the address. However, some texts with the subjects containing no information as to the contact information and the address may contain information as to the contact information and the address in their bodies. For example, a news reporting that the X hotel has added a new annex in its subject may possibly contain information as to the contact information and the address in its body. Therefore, the disclosed classification principle may not necessarily be effective to classify retrieved documents into those required by the user and those not required by the user.

An apparatus for and a method of classifying documents and a recording medium which stores a program for classifying documents, as disclosed in Japanese laid-open patent publication No. 10-320411, are capable of classifying documents with keywords with 5W1H attributes extracted from the documents. However, the type of 5W1H as a key for classification needs to be indicated by the user each time documents are to be classified. Furthermore, since documents are classified according to the unit of 5W1H, they cannot be classified according to smaller units including address, nearby station, telephone number, and e-mail address.

SUMMARY OF THE INVENTION

It is therefore an object of the present invention to provide a method of and an apparatus for easily retrieving documents that are required by the user.

A document retrieval apparatus according to a first aspect of the present invention classifies retrieved documents based on whether documents contain attribute elements representing specific contents related to certain attributes (concepts), and classifies documents containing attribute elements related to the certain attributes according to types of the certain attributes. The attribute elements represent elements which specifically indicate the contents of certain attributes, such as address, telephone number, nearby station, price, date, time, e-mail address, URL, company name, product name, type number, in the documents. For example, an attribute element representing an attribute of address is "Chiyoda ward, Tokyo metropolis", and an attribute element representing an attribute of price is "12,000 yen".

Specifically, the document retrieval apparatus has a classification attribute storage storing only types of indicated attributes, among a plurality of types of attributes that can be used to classify documents, an attribute analyzing means for analyzing each of the retrieved documents to determine whether an attribute element belonging to the types of attributes stored in the classification attribute storage is contained in the document or not, and an attribute classifying means for classifying each of the retrieved documents such that documents containing the same type of attribute elements fall in the same category and documents containing no attribute elements fall in an independent category.

The attribute classifying means analyzes each of the retrieved documents, and sends information indicating which one of the types of attributes stored in the classification attribute storage an attribute element contained in the document belongs to, to the attribute classifying means. Based on the sent information, the attribute classifying means decides whether each of the retrieved documents contains an attribute element belonging to either one of the types stored in the classification attribute storage or not. If the document contains an attribute element, then the attribute classifying means classifies the document into a category corresponding to the type of the attribute element contained therein. If the document does not contain an attribute element belonging to any one of the types stored in the classification attribute storage, then the attribute classifying means classifies the document into a category of documents containing no attribute elements.

A document retrieval apparatus according to a second aspect of the present invention classifies retrieved documents based on whether documents contain the same attribute element of a certain type. Specifically, the document retrieval apparatus has a classification attribute storage storing only types of indicated attributes, among a plurality of types of attributes that can be used to classify documents, an attribute element extracting means for extracting an attribute element belonging to the type of an attribute indicated by a user who has made a retrieval request, among the types of attributes stored in the classification attribute storage, from each of the retrieved documents, and an attribute element classifying means for classifying each of the retrieved documents such that documents containing the same type of attribute elements fall in the same category and documents containing no attribute elements fall in an independent category.

The attribute element extracting means extracts an attribute element belonging to the type of an attribute indicated by a user who has made a retrieval request, among the types of attributes stored in the classification attribute storage, from each of the retrieved documents, and sends information indicating which document contains which attribute element to the attribute element classifying means. Based on the sent information, the attribute element classifying means decides whether each of the retrieved documents contains an attribute element of the type indicated by the user or not. If the document contains an attribute element, then the attribute element classifying means classifies the document into a category corresponding to the attribute element contained therein. If the document does not contain an attribute element belonging to any one of the types stored in the classification attribute storage, then the attribute element classifying means classifies the document into a category of documents containing no attribute elements.

A document retrieval apparatus according to a third aspect of the present invention classifies retrieved documents such that documents containing attribute elements of a certain type which have similar meanings fall in one category. Specifically, the document retrieval apparatus has a classification attribute storage storing only types of indicated attributes, among a plurality of types of attributes that can be used to classify documents, a thesaurus storage storing words as hyperonyms of words, an attribute element extracting means for extracting an attribute element belonging to the type of an attribute indicated by a user who has made a retrieval request, among the types of attributes stored in the classification attribute storage, from each of the documents retrieved by the document retrieving means, and an attribute element thesaurus classifying means for classifying each of the retrieved documents such that documents with respect to which words representing the extracted attribute element and corresponding to a hyperonym at a level indicated by the user are the same as each other fall in one category.

The thesaurus storage contains words arranged as hyperonyms and hyponyms in a hierarchical structure, with absolute levels assigned to respective levels of the hierarchical structure. The attribute element extracting means extracts an attribute element belonging to the type of an attribute indicated by the user, among the types of attributes stored in the classification attribute storage, from each of the retrieved documents, and sends information indicating which document contains which attribute element to the attribute element thesaurus classifying means. Based on the sent information, the attribute element thesaurus classifying means decides whether each of the retrieved documents contains an attribute element of the type indicated by the user or not. If the document contains an attribute element, then the attribute element thesaurus classifying means looks up the thesaurus storage, determines a word as a hyperonym of the attribute element at the level indicated by the user, and classifies the document into a category corresponding to the attribute element as the hyperonym. If the document does not contain an attribute element of the type indicated by the user, then the attribute element thesaurus classifying means classifies the document into a category of documents containing no attribute elements.

A first advantage of the present invention is that it is possible for the user who has made a retrieval request to easily select documents containing an attribute element of the type required from a number of retrieved documents.

The reason for the first advantage is that the types of attributes to be actually used for classifying retrieved documents are selected from types of attributes that can be used as classification keys, e.g., address, telephone number, nearby station, price, date, time, e-mail address, URL, company name, product name, type number, etc., and stored in the classification attribute storage, and the retrieved documents are classified using only the types of attributes stored in the classification attribute storage. Specifically, since an effective classification keys (classification factors) is different for each field to which documents to be retrieved belong, if documents are classified using a classification key fixed to 5W1H, then the documents may not be classified in a manner allowing the user to sort out the documents easily.

According to the present invention, since the user can select a type of attribute depending on the field to which documents to be retrieved belong, from many types of attributes and use the selected type of attribute as a classification key, the documents can be classified in a manner allowing the user to sort out the documents easily.

A second advantage of the present invention is that the retrieved documents can be divided into documents containing an attribute element in question and documents containing no attribute element in question. If documents containing no attribute element in question are not required, then the unwanted documents can easily be excluded from the retrieved documents.

The reason for the second advantage is that the attribute analyzing means analyzes each of the retrieved documents to determine which type of attribute element stored in the classification attribute storage is contained in the document, and the attribute classifying means classifies documents which do not contain the attribute elements of the types stored in the classification attribute storage into an independent category.

A third advantage of the present invention is that retrieved documents can be classified according to an attribute element of a certain type in the documents. As a result, the user who needs documents containing an attribute element of a certain type can obtain retrieved documents that have been classified according to specific contents of the documents, i.e., contents corresponding to an item required by the user. As a consequence, the retrieved documents can further be narrowed down.

The reason for the third advantage is that the attribute element extracting means extracts an attribute element of the type indicated by the user, and the attribute element classifying means classifies the retrieved documents such that documents containing the same attribute element fall in the same category.

A fourth advantage of the present invention is that retrieved documents containing attribute elements which have similar meanings are classified into one category so that categories in which the retrieved documents are classified will not be too detailed. When the user specifies a level for classification, the user can obtain classified documents at a desired detailed degree.

The reason for the fourth advantage is that the thesaurus storage holds words as hyperonyms of words, and the attribute element thesaurus classifying means determines a word as a hyperonym at a level indicated by the user from attribute elements extracted from the documents, and classifies each of the retrieved documents such that documents whose determined words are the same as each other fall in one category.

A fifth advantage of the present invention is that it is possible to reduce the number of categories so that there will not be too many categories for classifying retrieved documents.

The reason for the fifth advantage is the same as the reason for the fourth advantage. Specifically, the thesaurus is looked up, and documents containing attribute elements which have similar meanings are classified into one category for thereby reducing the number of categories.

The above and other objects, features, and advantages of the present invention will become apparent from the following description with reference to the accompanying drawings which illustrate examples of the present invention.

BRIEF DESCRIPTION OF THE DRAWINGS

FIGS. 3A through 3J are views showing documents retrieved by a document retriever of the document retrieval system according to the first embodiment of the present invention;

DESCRIPTION OF THE PREFERRED EMBODIMENTS

Identical or corresponding parts are denoted by identical or corresponding reference characters throughout views.

1st Embodiment

Figure 1:
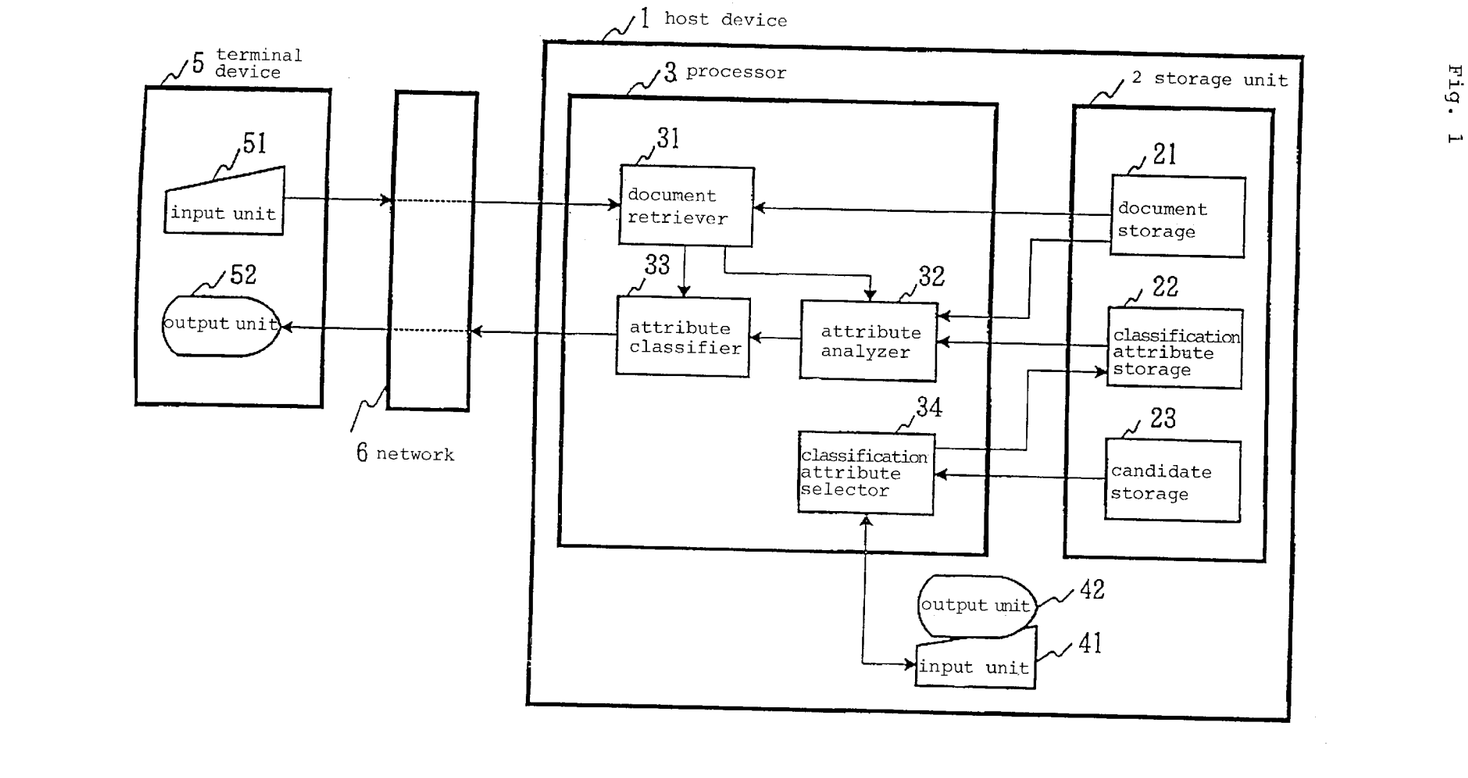
FIG. 1 is a block diagram of a document retrieval system according to a first embodiment of the present invention.

Referring now to FIG. 1, there is shown a document retrieval system according to a first embodiment of the present invention which generally comprises a host device 1, a terminal device 5, and a network 6 which interconnects host device 1 and the terminal device 5.

The terminal device 5 includes an input unit 51 such as a keyboard, a mouse, etc., and an output unit 52 such as a display unit or the like.

The host device 1 comprises a storage unit 2, a processor 3, an input unit such as a keyboard, a mouse, etc., and an output unit 42 such as a display unit or the like.

The storage unit 2 has a document storage 21 a classification attribute storage 22, and a candidate storage 23.

The document storage 21 stores a plurality of documents belonging to a certain field which are to be retrieved. The candidate storage 23 stores the types of a plurality of attributes that can be used to classify documents. The classification attribute storage 22 stores the types of attributes actually used as classification keys for classifying retrieved documents.

Attribute elements refer to elements specifically representing details of certain concepts in documents, such as address, telephone number, nearby station, price, date, time, e-mail address, URL, company name, product name, type number, etc. The types of the concepts such as address, telephone number, etc. represent the types of attributes. The attribute element representing the attribute of address is referred to as "address element". For example, in the sentence "Company A sells product X at a standard price of 2,000 yen", "Company A" is the company element, "2,000 yen" is the price element, and "product X" is the product element.

The classification attribute storage 22 stores those which are actually used as keys for classification, of the types of attributes that are stored in the candidate storage 23. If the types of attributes that are stored in the classification attribute storage 22 are related to the field of documents stored in the document storage 21, then documents classified by only effective classification keys can be presented to the user. For example, for the user who tries to retrieve restaurant information, information as to whether a product name, a type number, etc. are contained in documents or not does not serve as a criterion for sorting out retrieved documents. If the document storage 21 of the host device 1 stores documents relative to restaurant information, then the classification attribute storage 22 may store address, telephone number, nearby station, and price as the types of attributes, so that retrieved documents can be classified according to address, telephone number, nearby station, and price.

The processor 3 comprises a document retriever 31, an attribute analyzer 32, an attribute classifier 33, and a classification attribute selector 34.

The document retriever 31 receives a retrieving condition which the user of the terminal device 5 has entered using the input unit 51 via the network 6, retrieves documents matching the retrieving condition from the document storage 21 and sends identifiers such as document names and document numbers of the retrieved documents to the attribute analyzer 32 and the attribute classifier 33. The retrieving condition may be one or more keywords, and the document retriever 31 retrieves documents which contain all the keywords.

The attribute analyzer 32 looks up the classification attribute storage 22, reads the types of attributes used for document classification, looks up the document storage 21 analyzes whether each of the documents indicated by the identifiers sent from the document retriever 31 contains attribute elements corresponding to the types of attributes stored in the classification attribute storage 22, and sends information indicative of which document contains which type of attribute element to the attribute classifier 33.

The attribute classifier 33 classifies the identifiers of the retrieved documents received from the document retriever 31, according to the information relative to attribute elements contained in documents which has been analyzed by the attribute analyzer 32, and sends the classified identifiers to the output unit 52 via the network 6. Specifically, a document containing a certain type of attribute element is classified into a category corresponding to the type of attribute element, and a document containing no attribute element is classified into a category corresponding to that document. A document containing two or more types of attribute element is classified into two or more categories. The output unit 52 may output classified identifiers in the form of a list of documents classified into each category or in the form of the number of documents classified into each category.

The classification attribute selector 34 displays the types of attributes stored in the candidate storage 23 on the output unit 42, and stores only the types of attributes which are selected by the host administrator using the input unit 41 into the classification attribute storage 22.

The document retriever 31, the attribute analyzer 32, the attribute classifier 33, and the classification attribute selector 34 may be stored as a document retrieval program in a recording medium such as a CD-ROM or a floppy disk, and may be read and run by a processor including a CPU.

Figure 2:
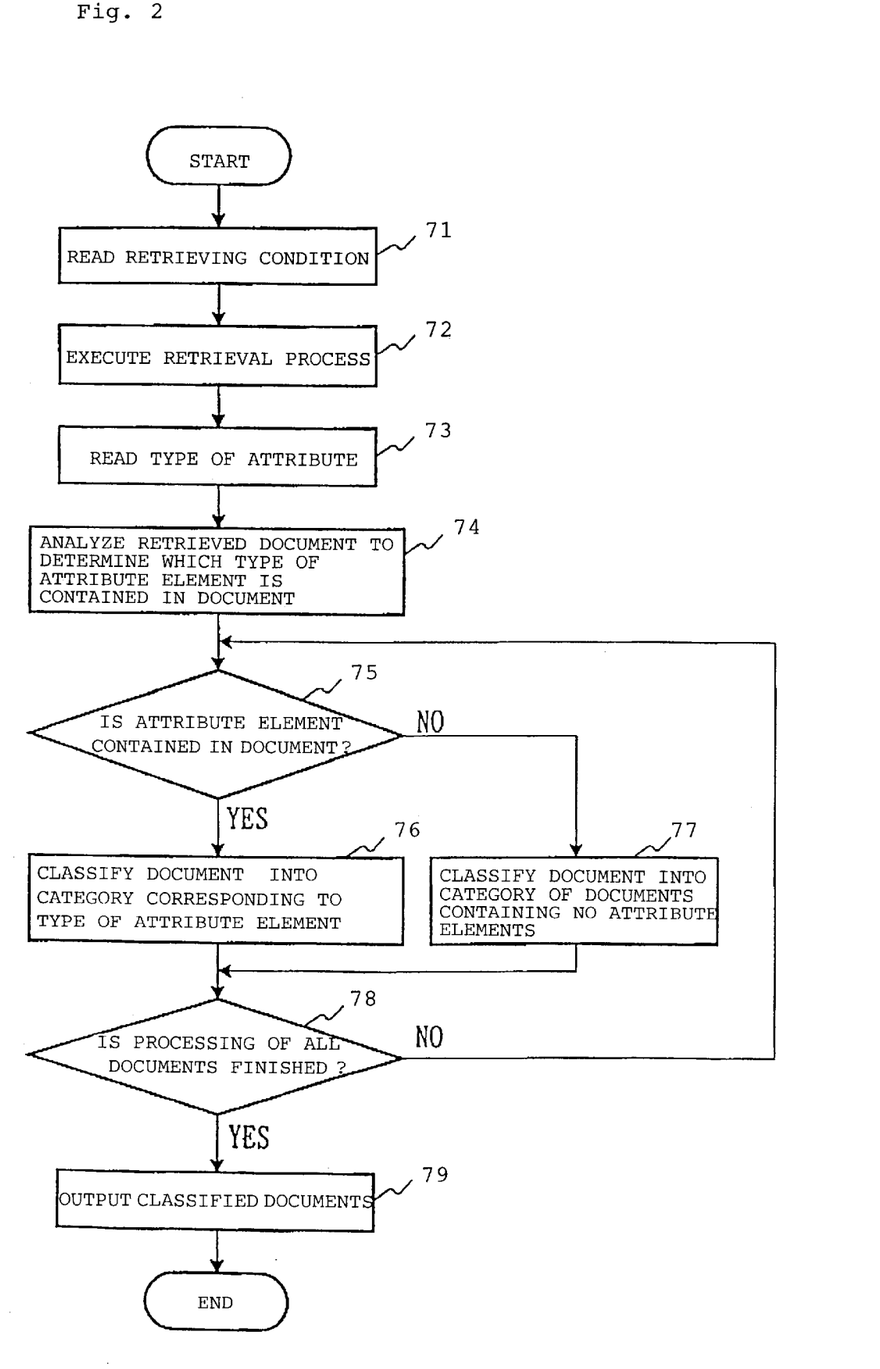
FIG. 2 is a flowchart of a processing sequence of a processor of the document retrieval system according to the first embodiment of the present invention.

Operation of the document retrieval system according to the first embodiment of the present invention will be described below with reference to FIGS. 1 and 2.

Before the host administrator starts to operate the host device 1 as a document retrieval device, the host administrator stores the types of attributes for use as classification keys via the classification attribute selector 34 into the classification attribute storage 22. At this time, the classification attribute selector 34 operates as follows: When the classification attribute selector 34 is activated by the host administrator, the classification attribute selector 34 displays the types of all attributes stored in the candidate storage 23 on the output unit 42. The host administrator then selects the types of attributes which can be effective classification keys for the user to sort out retrieved documents, from the displayed types of attributes, using the input unit 41. For example, if the document storage 21 stores documents bearing restaurant information, then the host administrator selects address, telephone number, nearby station, and price from the displayed types of attributes. The classification attribute selector 34 stores the types of attributes selected by the host administrator into the classification attribute storage 22.

A document retrieval process of the document retrieval system according to the first embodiment will be described below.

In step 71, the document retriever 31 reads a retrieving condition which the user of the terminal device 5 has entered via the input unit 51. In step 72, the document storage 21 retrieves documents matching the retrieving condition, and sends the document identifiers of all the documents matching the retrieving condition to the attribute analyzer 32 and the attribute classifier 33.

Then, in step 73, the attribute analyzer 32 looks up the classification attribute storage 22 and reads the types of attributes for use as classification keys from the classification attribute storage 22. In step 74, the attribute analyzer 32 looks up the document storage 21, analyzes each of the documents whose document identifiers have been sent from the document retriever 31, to determine which one of the types of attributes read in step 73 an attribute element contained in the document belongs to, and sends the analyzed result, i.e., the determined type of attribute, to the attribute classifier 33. If the document does not contain an attribute element belonging to any one of the types of attributes read in step 73, then the attribute analyzer 32 sends the analyzed result indicating that the document does not contain an attribute element to the attribute classifier 33.

An attribute element contained in a document can be detected or extracted by effecting a morphemic analysis on the document under the condition of words that match a certain pattern. For example, words that match a pattern of "### prefecture ### city" may be referred to as an address element, words that match a pattern of "### month ### day" as a date element, words that match a pattern of "http:// ###" as a URL element, and words that match a pattern of "### Co., Ltd." as a company name element. Alternatively, words representing company names and product names may be collected in advance, words in documents may be checked against the collected words, and those words which agree with the collected words may be referred to as a company name element and a product name element.

In step 75, the attribute classifier 33 determines whether a document whose document identifier has been sent from the document retriever 31 contains any one of attribute elements corresponding to the types of attributes stored in the classification attribute storage 22 or not, based on the information sent from the attribute analyzer 32. If the document contains either one of attribute elements, then the attribute classifier 33 classifies the document into a category corresponding to the type of the attribute element contained in the document in step 75. If the document contains a plurality of attribute elements, then the attribute classifier 33 classifies the document into a plurality of categories corresponding to the types of the attribute elements contained in the document in step 75. If the document does not contain any one of attribute elements, then the attribute classifier 33 classifies the document into a category of documents that contain no attribute elements in step 77.

The attribute classifier 33 confirms whether the classification of all the documents retrieved by the document retriever 31 has been finished or not in step 78. If the classification of all the documents has been finished, then the attribute classifier 33 outputs the classified result in step 79, after which the document retrieval process is ended. If the classification of all the documents has not been finished, then control returns to step 75 and repeats the subsequent steps.

A specific example of the document retrieval process of the document retrieval system according to the first embodiment will be described below.

It is assumed that the document retrieval system is to retrieve documents containing a keyword "roast meat", for example.

It is also assumed that the types of attributes (stored in the classification attribute storage 22) which the document retrieval system uses for document classification are only "address" and "price".

The document retriever 31 reads the keyword "roast meat" entered from the input unit 51 in step 71. The document retriever 31 retrieves documents containing the keyword "roast meat" from the document storage 21 in step 72. As shown in FIGS. 3A through 3J, the retrieved documents are documents having respective document identifiers #1–#10, for example.

The attribute analyzer 32 looks up the classification attribute storage 22 and reads the types of attributes used for document classification, i.e., "address" and "price" in step 73. Then, in step S74, the attribute analyzer 32 analyzes each of the retrieved documents #1–#10 to determine whether the attribute elements of the types read in step 73 are contained in each of the documents. Since the two types of attributes, i.e., "address" and "price" have been read in step 73, the attribute analyzer 32 checks if each of the documents contains an address element and a price element. The attribute analyzer 32 regards words matching the patterns of "### metropolis", "### province", "### district", "### prefecture", for example, as an address element, and words matching the pattern of "### yen" as a price element. The words that match these patterns contained in the retrieved documents #1–#10 are set forth in Table 1 shown below. Therefore, the attribute analyzer 32 determines that the documents #1, #4, #5, #6, #7, #10 contain an address element, the documents #1, #3, #4 contain a price element, and the documents #2, #8, #9 do not contain the types of attribute elements read in step 73.

TABLE 1

| Document No. | Attribute element | Attribute type |
| --- | --- | --- |
| #1 | 3000 yen | price |
|  | Tokyo metropolis | address |
|  | Tokyo metropolis | address |
| #3 | 2000 yen | price |
| #4 | Osaka district | address |
|  | 2500 yen | price |
|  | 1500 yen | price |
| #5 | Kanagawa prefecture | address |

TABLE 1-continued

| Document No. | Attribute element | Attribute type |
| --- | --- | --- |
| #6 | Osaka district | address |
| #7 | Kyoto district | address |
| #10 | Tokyo metropolis | address |
|  | Tokyo metropolis | address |
|  | Kanagawa prefecture | address |

The attribute classifier 33 receives the analyzed result from the attribute analyzer 32, and classifies the documents #1–#10. First, the attribute classifier 33 decides whether the document #1 shown in FIG. 3A contains the attribute elements of the types stored in the classification attribute storage 22 or not in step 75. Since the document #1 contains the address element and the price element, the attribute classifier 33 determines that the document #1 contains attribute elements, and classifies the document #1 into two categories, i.e., a category of documents containing the address element and category of documents containing the price element, in step 76.

Then, the attribute classifier 33 decides whether the classification of all the documents has been finished or not in step 78. Because 9 documents remain to be classified, the attribute classifier 33 determines that the classification of all the documents has not been finished. Control returns to step 75 to process a next document.

Inasmuch as the document #2 does not contain any of the attribute elements of the types stored in the classification attribute storage 22, the attribute classifier 33 determines the document #2 to be a document which does not contain the attribute elements in step 75, and classifies the document #2 into a category of documents that do not contain the attribute elements in step 77.

The processing in step 75 and step 76 or 77 is subsequently repeated with respect to the documents #3–#10. In step 79, the attribute classifier 33 outputs the classified result, after which the document retrieval process is ended. For example, the outputted classified result is set forth in Table 2 shown below.

TABLE 2

| Documents containing address element | 6 documents | #1, #4, #5, #6, #7, #10 |
| --- | --- | --- |
| Documents containing price element | 3 documents | #1, #3, #4 |
| Documents containing no attribute elements | 3 documents | #2, #8, #9 |

With the present embodiment, retrieved documents are classified according to the types of attribute elements contained therein, and documents which do not contain attribute elements are classified into a single independent category. Therefore, it is possible to select, from retrieved documents, only those documents containing attributes such as address, telephone number, nearby station, price, date, time, e-mail address, URL, company name, product name, type number, etc.

Furthermore, some of the types of attributes stored in the candidate storage 23 are stored into the classification attribute storage 22 by the classification attribute selector 34, and retrieved documents are classified using only the types of attributes that are stored in the classification attribute storage 22. Since the types of attributes that are stored in the classification attribute storage 22 can be selected to match documents to be retrieved, the retrieved documents can be classified from a classification viewpoint that is suited to the documents to be retrieved. If the types of attributes for document classification are selected to match documents to be retrieved, then the user can obtain documents that have been classified by only effective classification keys.

2nd Embodiment

Figure 4:
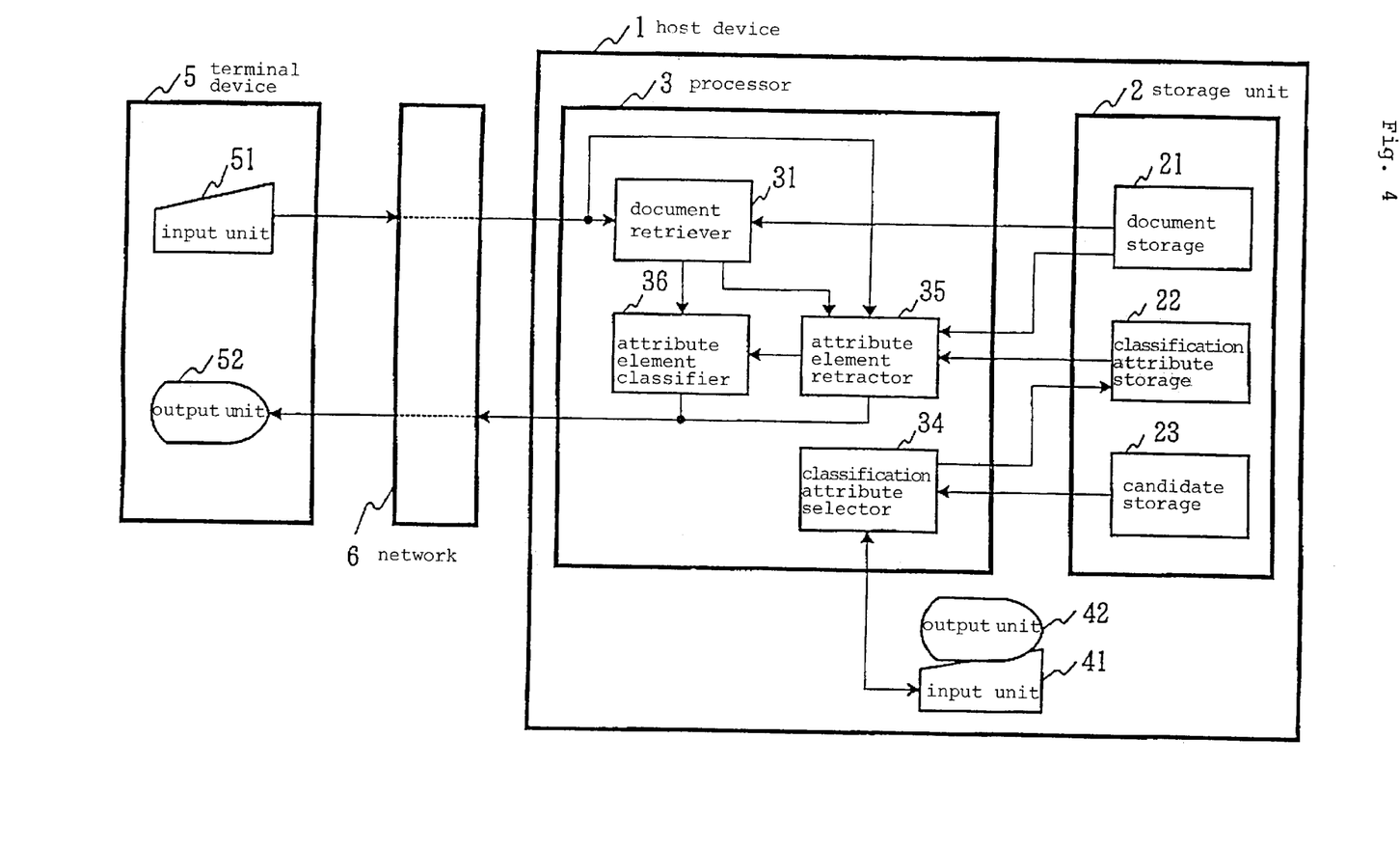
FIG. 4 is a block diagram of a document retrieval system according to a second embodiment of the present invention.

As shown in FIG. 4, a document retrieval system according to a second embodiment of the present invention has a host device 1 including a processor 3 which differs from the processor 3 according to the first embodiment shown in FIG. 1 in that the attribute analyzer 32 shown in FIG. 1 is replaced with an attribute element extractor 35 and the attribute classifier 33 is replaced with an attribute element classifier 36.

The attribute element extractor 35 looks up the classification attribute storage 22, reads the types of attributes used for document classification, receives the types of attributes indicated by the user from the input unit 51 via the network 6, looks up the document storage 21 and extracts the types of attribute elements indicated by the user from the attribute elements contained in retrieved documents sent from the document retriever 31. The attribute element extractor 35 also sends information indicating which attribute elements are extracted from which documents to the attribute element classifier 36.

The attribute element classifier 36 classifies the retrieved documents received from the document retriever 31 according to the attribute elements of the types in the documents which have been extracted by the attribute element extractor 35, so that those documents containing the same attribute elements are placed in the same category, and outputs the classified documents to the output unit 52. The attribute element classifier 36 classifies those documents from which the types of attribute elements indicated by the user have not been extracted by the attribute element extractor 35, into a category of such documents. A document containing two or more different attribute elements is classified into two or more categories corresponding to those different attribute elements. As with the first embodiment, the output unit 52 may output a list of documents classified into each category or the number of documents classified into each category.

In the second embodiment, the document retriever 31, the classification attribute selector 34, the attribute element extractor 35, and the attribute element classifier 36 may be stored as a document retrieval program in a recording medium such as a CD-ROM or a floppy disk, and may be read and run by a data processor.

Figure 5:
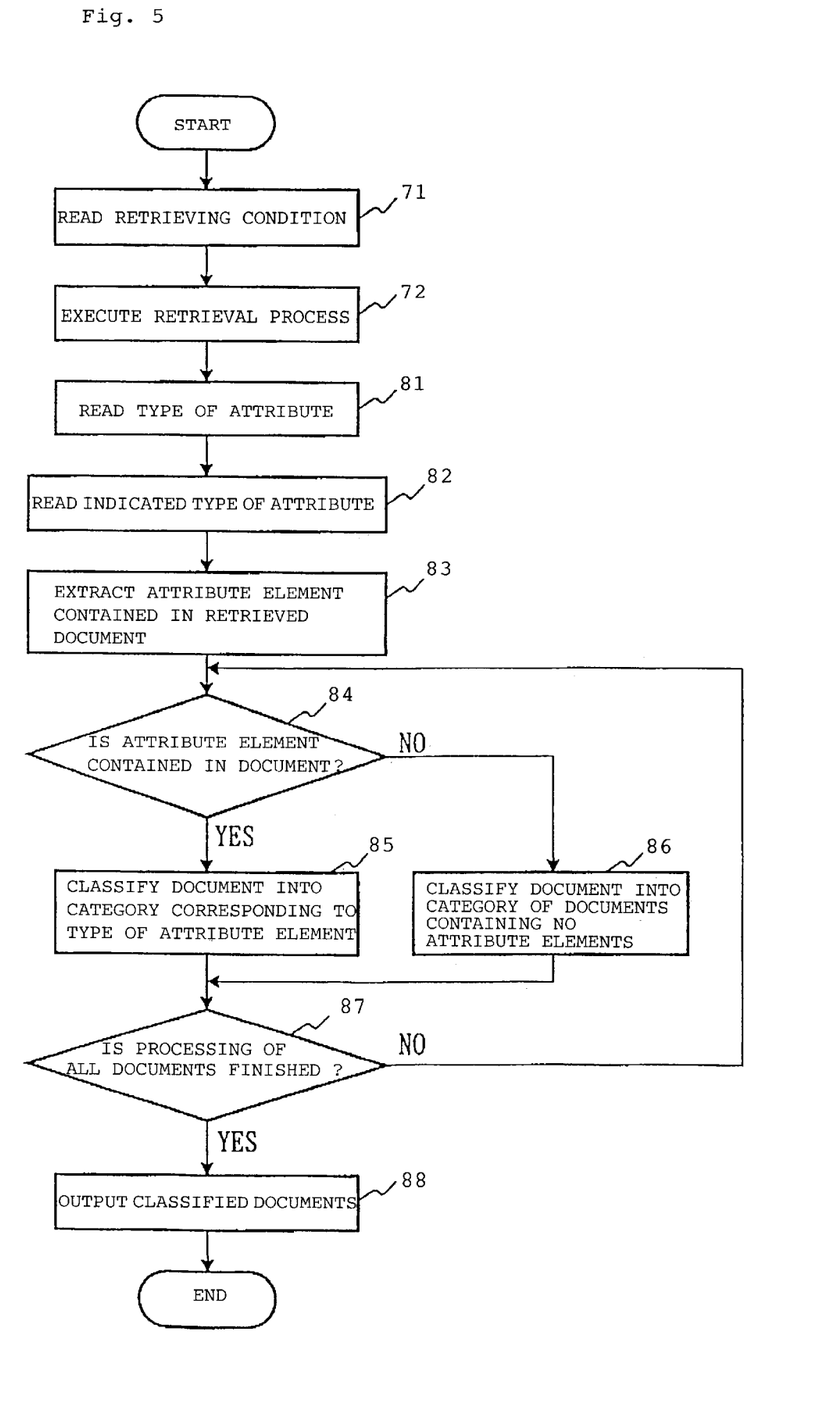
FIG. 5 is a flowchart of a processing sequence of a processor of the document retrieval system according to the second embodiment of the present invention.

A document retrieval process of the document retrieval system according to the second embodiment will be described below with reference to FIGS. 4 and 5.

The processing in steps 71, 72 shown in FIG. 5, which is carried out by the document retriever 31 according to the second embodiment, is the same as the corresponding processing carried out by the document retriever 31 according to the first embodiment and will not be described in detail below.

After the processing in steps 71, 72, the attribute element extractor 35 reads all types of attributes stored in the classification attribute storage 22, and sends the read types of attributes to the terminal device 5 which has made a retrieval request, in step 81.

The output unit 52 of the terminal device 5 displays the types of attributes sent from the attribute element extractor 35. Having seen the displayed types of attributes, the user of the terminal device 5 selects the type of an attribute which needs to be contained in documents from the displayed types of attributes. The selected type of an attribute is sent from the terminal device 5 via the network 6 to the host device 1.

The attribute element extractor 35 reads the selected type of an attribute sent from the terminal device 5 via the network 6 in step 82. Then, the attribute element extractor 35 looks up the document storage 21 and extracts an attribute element of the type read in step S82 from the documents whose document identifiers have been sent from the document retriever 31, and sends the extracted attribute element to the attribute element classifier 36 in step 83.

In step 84, the attribute element classifier 36 decides whether the attribute element of the type indicated by the user is extracted from a document whose document identifier has been sent from the document retriever 31 or not, based on the information sent from the attribute element extractor 35. If the document contains the attribute element of the type indicated by the user, then the attribute element classifier 36 classifies the document into a category corresponding to the attribute element in step 85. If the document contains a plurality of attribute elements, then the attribute element classifier 36 classifies the document into a plurality of categories in step 85. If the document does not contain any one of attribute elements of the types indicated by the user, then the attribute element classifier 36 classifies the document into a category of documents which do not contain attribute elements in step 86.

The attribute element classifier 36 confirms whether the classification of all the documents has been finished or not in step 87. If the classification of all the documents has been finished, then the attribute element classifier 36 outputs the classified result in step 88, after which the document retrieval process is ended. If the classification of all the documents has not been finished, then control returns to step 84 and repeats the subsequent steps.

A specific example of the document retrieval process of the document retrieval system according to the second embodiment will be described below.

It is assumed that the document retrieval system is to retrieve documents containing a keyword "roast meat", for example. It is also assumed that the types of attributes "address" and "price" are stored in the classification attribute storage 22. The processing in steps 71, 72 shown in FIG. 5, which is carried out by the document retriever 31 according to the second embodiment, is the same as the corresponding processing carried out by the document retriever 31 according to the first embodiment and will not be described in detail below. It is assumed that the document retriever 31 retrieves 10 documents having respective document identifiers #1–#10 in step 72.

After the processing in steps 71, 72, the attribute element extractor 35 reads all types of attributes "address", "price" stored in the classification attribute storage 22, and sends the read types of attributes to the terminal device 5 which has made a retrieval request, in step 81. The output unit 52 of the terminal device 5 displays the types of attributes "address", "price" sent from the attribute element extractor 35. Having seen the displayed types of attributes, the user of the terminal device 5 selects the type of an attribute which needs to be contained in documents, e.g., "address", from the displayed types of attributes "address", "price", using the input unit 51. The selected type of an attribute is sent from the terminal device 5 via the network 6 to the host device 1.

The attribute element extractor 35 reads the type of an attribute "address" indicated by the user which has been sent from the terminal device 5 in step 82. In step 83, the attribute element extractor 35 extracts the address elements contained in all the retrieved documents #1–#10. If the attribute element extractor 35 determines the address elements in the same manner as with the attribute analyzer 32 according to the specific example of the first embodiment, then only the address elements set forth in Table 3 shown below are extracted in step 83.

TABLE 3

| Document No. | Address element |
|---|---|
| #1 | Tokyo metropolis |
|  | Tokyo metropolis |
| #4 | Osaka district |
| #5 | Kanagawa prefecture |
| #6 | Osaka district |
| #7 | Kyoto district |
| #10 | Tokyo metropolis |
|  | Tokyo metropolis |
|  | Kanagawa prefecture |

The attribute element classifier 36 receives the extracted address elements, and classifies the retrieved documents #1–#10. Specifically, in step 84, the attribute element classifier 36 decides whether an address element is extracted from the document #1. Since the address element "Tokyo metropolis" is extracted from the document #1, the attribute element classifier 36 determines that an address element is extracted from the document #1, and classifies the document #1 into a category of "Tokyo metropolis".

Then, the attribute element classifier 36 confirms whether the classification of all the documents #1–#10 has been finished or not in step 87. Because 9 documents remain to be classified, the attribute element classifier 36 determines that the classification of all the documents has not been finished. Control returns to step 84 to process a next document.

Because the document #2 does not contain an address element, the attribute element classifier 36 determines that no address element is extracted from the document #2 in step 84, and classifies the document #2 into a category of documents which contain no address elements in step 84.

The processing in step 84 and step 85 or 86 is subsequently repeated with respect to the documents #3–#10. In step 88, the attribute element classifier 36 outputs the classified result, after which the document retrieval process is ended. For example, the outputted classified result is set forth in Table 4 shown below.

TABLE 4

| Tokyo metropolis | 2 documents | #1, #10 |
| Osaka district | 2 documents | #4, #6 |
| Kanagawa prefecture | 2 documents | #5, #10 |
| Kyoto district | 1 document | #7 |
| No attribute elements | 3 documents | #2, #8, #9 |

With the second embodiment, retrieved documents are classified according to each attribute element of the type indicated by the user. Since the retrieved documents are classified according to an attribute element of the type indicated by the user which is contained in the documents, the user who wants to have documents that contain an attribute of a certain type can obtain retrieved documents classified according to the contents of the documents relative to the attribute of the type which the user needs. Therefore, it is possible to easily narrow down the retrieved documents.

3rd Embodiment

Figure 6:
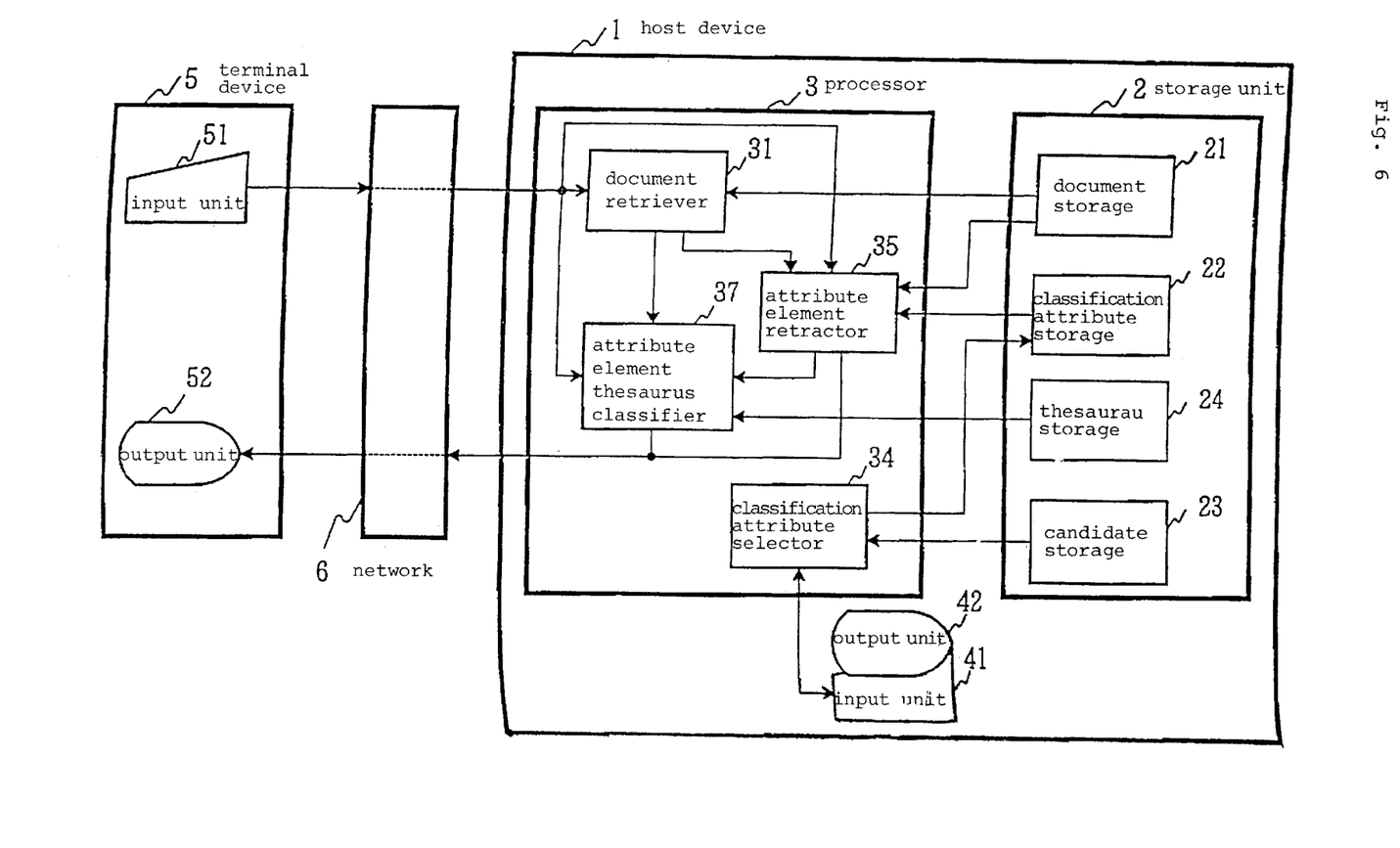
FIG. 6 is a block diagram of a document retrieval system according to a third embodiment of the present invention.

As shown in FIG. 6, a document retrieval system according to a third embodiment of the present invention has a host device 1 including a storage unit 2 which differs from the storage unit 2 according to the second embodiment shown in FIG. 4 in that it additionally has a thesaurus storage 24, and a processor 3 which differs from the processor 3 according to the second embodiment shown in FIG. 4 in that the attribute element classifier 36 shown in FIG. 4 is replaced with an attribute element thesaurus classifier 37.

The thesaurus storage 24 stores a thesaurus in which each word is linked to a word that represents a hyperonym of the word. For example, if each of Company A, Company B, and Company C is an electric products manufacturer, then the words "Company A", "Company B", and "Company C" in the thesaurus are linked to a word "electric products manufacturer" which is a common hyperonym of those words.

Since a word can recursively be present as a hyperonym of a word which is also a hyperonym of another word in the thesaurus, words and hyperonyms make up a hierarchical structure. In the thesaurus storage 24, absolute levels are assigned to respective levels of the hierarchical structure in the thesaurus. For example, if the thesaurus contains "Tokyo metropolis" as a hyperonym of "Minato ward" and "Japan" as a hyperonym of "Tokyo metropolis", then "Minato ward" is assigned level 2, "Tokyo metropolis" is assigned level 1, and "Japan" is assigned level 0.

The attribute element thesaurus classifier 37 reads a level which is indicated by the user via the input unit 51, classifies retrieved documents received from the document retriever 31 according to attribute elements of certain types in the documents which are extracted by the attribute element extractor 35, such that those documents containing the same word as a hyperonym at the indicated level with respect to the attribute elements are classified into the same category, and outputs the classified documents to the output unit 52. For example, if a hyperonym of "PC-ABC" and "XYZ-PC" is "personal computer", "PC-ABC" and "XYZ-PC" have level 1, and "personal computer" has level 0, then when the user indicates level 1, documents containing "PC-ABC" and documents containing "XYZ-PC" are classified into different categories, and when the user indicates level 0, documents containing "PC-ABC" and documents containing "IXYZ-PC" are classified into the same category.

If any attribute elements of the types indicated by the user are not extracted from retrieved documents by the attribute element extractor 35, then the retrieved documents are classified into a categories of such documents by the attribute element thesaurus classifier 37. A document containing two or more different attribute elements may be classified into two or more categories. The output unit 52 may output a list of documents classified into each category or the number of documents classified into each category, as with the second embodiment.

For determining a word as a hyperonym at the indicated level with respect to each word, the attribute element thesaurus classifier 37 looks up the thesaurus storage 24. However, if the type of attribute elements which is indicated by the user is an attribute representing date, time, price, etc., then a certain range may be used as a hyperonym. For example, one month of June, 1999 may be used as a hyperonym of Jun. 20, 1999, and one year of 1999 may be used as a hyperonym of one month of June, 1999. Ranges for hierarchical levels may be determined in advance. If hyperonyms are thus defined, then it is not necessary for the attribute element thesaurus classifier 37 to look up the thesaurus storage 24.

The document retriever 31, the classification attribute selector 34, the attribute element extractor 35, and the attribute element thesaurus classifier 37 may be stored as a document retrieval program in a recording medium such as a CD-ROM or a floppy disk, and may be read and run by a processor including a CPU.

Figure 7:
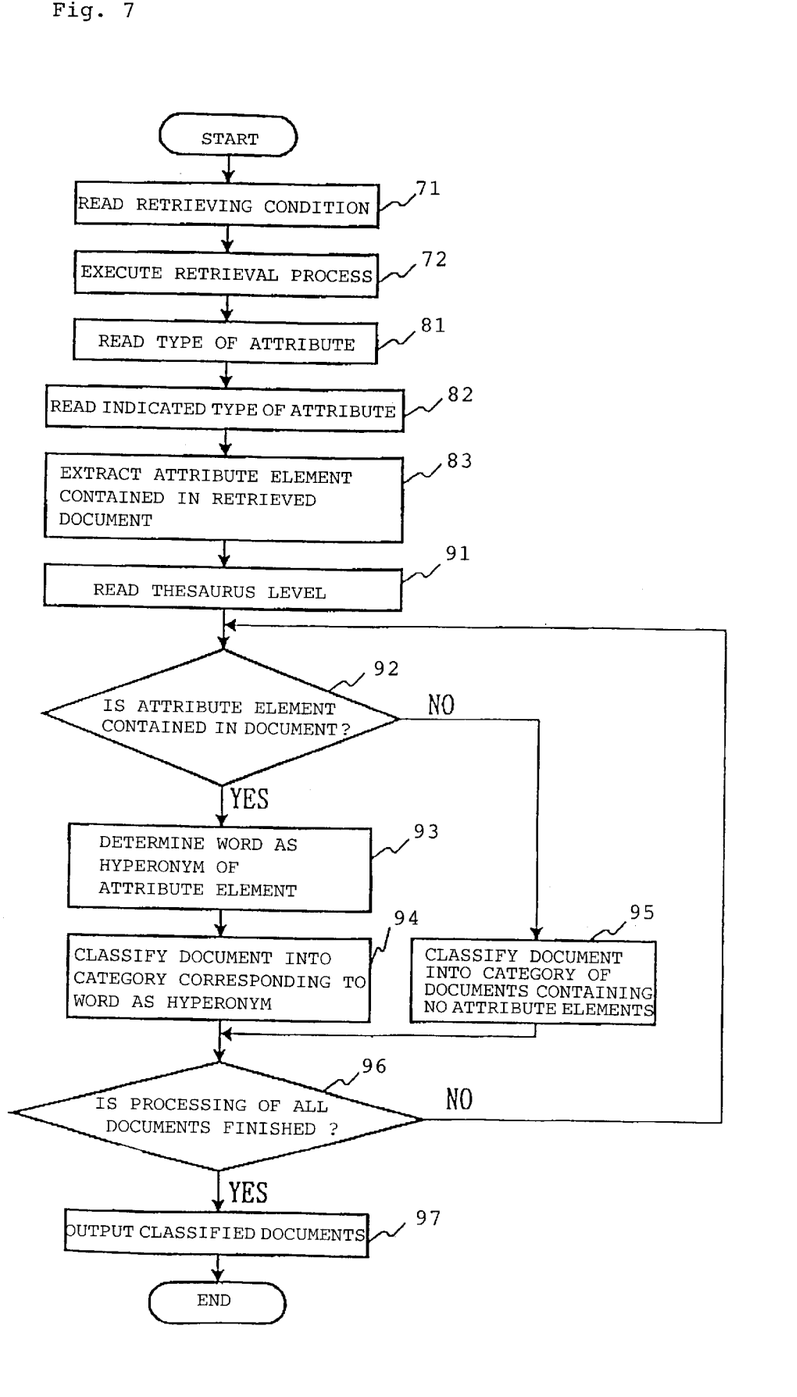
FIG. 7 is a flowchart of a processing sequence of a processor of the document retrieval system according to the third embodiment of the present invention.

Operation of the document retrieval system according to the third embodiment of the present invention will be described below with reference to FIGS. 6 and 7.

The processing in steps 71, 72, 81, 82, 83 shown in FIG. 7, which is carried out by the document retriever 31 and the attribute element extractor 35 according to the third embodiment, is the same as the corresponding processing carried out by the document retriever 31 and the attribute element extractor 35 according to the second embodiment and will not be described in detail below.

After the processing in steps 71, 72, 81, 82, 83, the attribute element thesaurus classifier 37 reads the level of a concept, which is indicated by the user, in the thesaurus for document classification via the input unit 51 in step 91. Then, the attribute element thesaurus classifier 37 decides whether an attribute element of the type indicated by the user is extracted from a document whose document identifier has been sent from the document retriever 31 or not according to the information sent from the attribute element extractor 35 in step 92.

If the document contains the attribute element of the type indicated by the user, then the attribute element thesaurus classifier 37 looks up the thesaurus storage 24 for all attribute elements contained in the document and determines a word representing a hyperonym at the level indicated by the user in step 93. Then, the attribute element thesaurus classifier 37 classifies the document into a category corresponding to the determined hyperonym in step 94. If the document contains a plurality of attribute elements, then attribute element thesaurus classifier 37 may determine a plurality of hyperonyms. In this case, the attribute element thesaurus classifier 37 classifies the document into a plurality of corresponding categories.

If the document contains no attribute element of the type indicated by the user, then the attribute element thesaurus classifier 37 classifies the document into a category of documents which contain no attribute elements in step 95.

The attribute element thesaurus classifier 37 confirms whether the classification of all the documents retrieved by the document retriever 31 has been finished or not in step 96. If the classification of all the documents has been finished, then the attribute element thesaurus classifier 37 outputs the classified result in step 97, after which the document retrieval process is ended. If the classification of all the documents has not been finished, then control returns to step 92 and repeats the subsequent steps.

A specific example of the document retrieval process of the document retrieval system according to the third embodiment will be described below.

Figure 8:
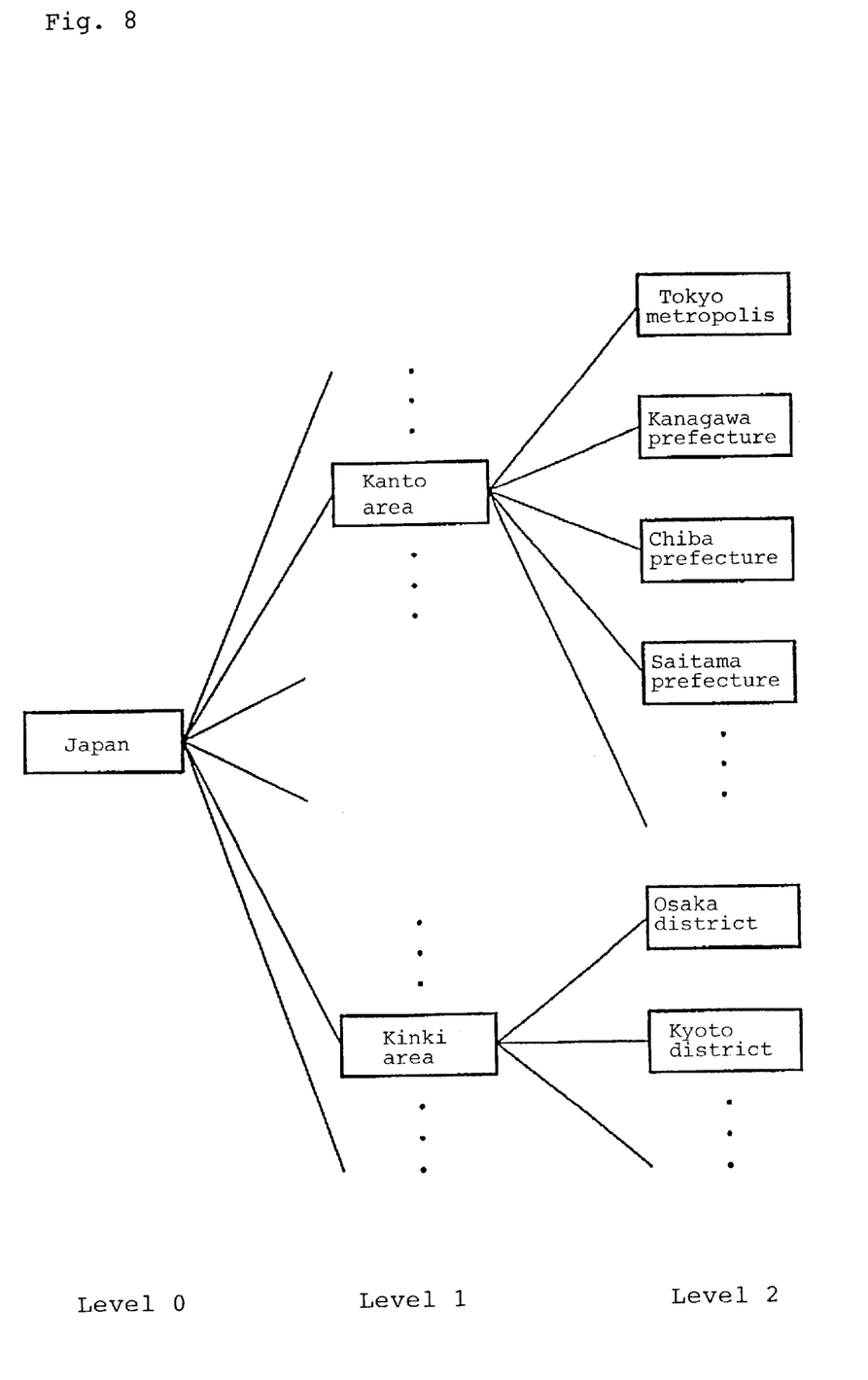
FIG. 8 is a diagram illustrative of data stored in a thesaurus storage unit of the document retrieval system according to the third embodiment of the present invention.

It is assumed that the thesaurus storage 24 stores a thesaurus of geographical names in a hierarchical arrangement as shown in FIG. 8. In FIG. 8, a word representing a hyperonym of "Tokyo metropolis", "Kanagawa prefecture", "Chiba prefecture", "Saitama prefecture", etc. is "Kanto area", and a word representing a hyperonym of "Kanto area", "Kinki area", etc. is "Japan". The words "Tokyo metropolis", "Kanagawa prefecture", "Chiba prefecture", "Saitama prefecture", etc. are assigned level 2, the words "Kanto area", "Kinki area", etc. are assigned level 1, and the word "Japan" is assigned level 0.

It is assumed that the document retrieval system is to retrieve documents containing a keyword "roast meat", for example. The processing in steps 71, 72, which is carried out by the document retriever 31, and the processing in steps 81, 82, 83, which is carried out by the attribute element extractor 35, are the same as the corresponding processing carried out by the document retriever 31 and the attribute element extractor 35 according to the second embodiment and will not be described in detail below. It is assumed that the same processing in steps 71, 72, 81, 82, 83 as the processing carried out according to the second embodiment has been performed. Specifically, documents #1–#10 shown in FIG. 3 have been retrieved in step 71, "address" has been read as the type of an attribute element indicated by the user in step 82, and address elements shown in Table 3 have been extracted from the documents in step 83.

The attribute element thesaurus classifier 37 reads a level of the thesaurus which is indicated by the user via the input unit 51 in step 91. It is assumed that the user has indicated level 1 of the thesaurus.

Then, the attribute element thesaurus classifier 37 receives an attribute element extracted by the attribute element extractor 35, and classifies the retrieved documents #1–#10. Specifically, the attribute element thesaurus classifier 37 decides whether an address element has been extracted from the document #1 or not in step 92. Since the address element "Tokyo metropolis" has been extracted from the document #1, the attribute element thesaurus classifier 37 determines that an address element has been extracted from the document #1, looks up the thesaurus storage 24, and determines a word which is a hyperonym of "Tokyo metropolis" at level 1 indicated by the user in step 93. In this example, the attribute element thesaurus classifier 37 determines the word "Kanto area" in step 93, and then classifies the document #1 into a category of "Kanto area" in step 94.

Then, the attribute element thesaurus classifier 37 decides whether the classification of all the documents #1–#10 has been finished or not in step 96. Because 9 documents remain to be classified, the attribute element thesaurus classifier 37 determines that the classification of all the documents has not been finished. Control returns to step 92 to process a next document.

Since the document #2 does not contain an address element, the attribute element thesaurus classifier 37 determines that no address element has been extracted from the document #2 in step 92, and classifies the document #2 into a category of documents which contain no address elements in step 95.

The processing in steps 92, 93, 94 or steps 92, 95 is subsequently repeated with respect to the documents #3–#10. In step 97, the attribute element thesaurus classifier 37 outputs the classified result, after which the document retrieval process is ended. For example, the outputted classified result is set forth in Table 5 shown below.

TABLE 5

| Kanto area | 3 documents | #1, #5, #10 |
|---|---|---|
| Kinki area | 3 documents | #4, #6, #7 |
| No attribute elements | 3 documents | #2, #8, #9 |

With the third embodiment, retrieved documents are classified according to each attribute element of the type indicated by the user that is contained in the documents. The retrieved documents which contain attribute elements belonging to the same concept at the level indicated by the user are classified into the same category. Therefore, even if may documents are retrieved and the retrieved documents contain many attribute elements of types indicated by the user, the number of categories can be reduced when the user indicates a suitable level of the thesaurus. Inasmuch as the user can freely set up a thesaurus level, it is possible to classify retrieved documents at the level required by the user.

In the second and third embodiments, if the number of categories is too large because a category is provided for each attribute element or each word as a hyperonym, then categories may be provided for only representative attribute elements or only words as hyperonyms, and documents containing attribute elements which do not belong to those categories may be classified into a category of "others". When instructed by the user, the documents classified into the category of "others" may further be classified recursively.

In the third embodiment, when instructed by the user, documents that have been classified into a category at a thesaurus level indicated by the user may be classified recursively at a different thesaurus level. The different thesaurus level at which the documents are to be classified recursively may be indicated again by the user, or may be one level higher or lower than the previous thesaurus level.

While preferred embodiments of the present invention have been described using specific terms, such description is for illustrative purposes only, and it is to be understood that changes and variations may be made without departing from the spirit or scope of the following claims.

What is claimed is:

1. A method of retrieving a document, comprising the steps of:

retrieving documents matching an indicated condition from a plurality of documents;

selecting the type of an attribute for use in classifying documents from a plurality of types of attributes that can be used to classify documents, and storing the selected type of an attribute in a classification attribute storage;

analyzing each of the retrieved documents to determine which one of types of attributes stored in said classification attribute storage an attribute element contained in the document belongs to; and classifying each of the retrieved documents into a category according to the type of the attribute element contained in the document based on the determined type of an attribute.

2. A method according to claim 1, further comprising the step of:

classifying a retrieved document which does not contain an attribute element of the types stored in said classification attribute storage, into an independent category.

3. A method of retrieving a document, comprising the steps of:

retrieving documents matching an indicated condition from a plurality of documents;

selecting the type of an attribute for use in classifying documents from a plurality of types of attributes that can be used to classify documents, and storing the selected type of an attribute in a classification attribute storage;

extracting an attribute element belonging to the type of an attribute indicated by a user who has made a retrieval request, among types of attributes stored in said classification attribute storage, from each of the retrieved documents; and classifying each of the retrieved documents into a category according to the attribute element contained in the document based on the extracted attribute element.

4. A method according to claim 3, further comprising the step of:

classifying a retrieved document which does not contain an attribute element belonging to the type of an attribute indicated by the user, into an independent category.

5. A method of retrieving a document, comprising the steps of:

retrieving documents matching an indicated condition from a plurality of documents;

selecting the type of an attribute for use in classifying documents from a plurality of types of attributes that can be used to classify documents, and storing the selected type of an attribute in a classification attribute storage;

extracting an attribute element belonging to the type of an attribute indicated by a user who has made a retrieval request, among types of attributes stored in said classification attribute storage, from each of the retrieved documents; and classifying each of the retrieved documents into a category according to a word which is a hyperonym of the extracted attribute element contained in the document and which is present at a hierarchical level indicated by a user who has made a retrieval request in a thesaurus of words contained as hyperonyms of words and arranged in a hierarchical structure.

6. A method according to claim 5, further comprising the step of:

classifying a retrieved document which does not contain an attribute element belonging to the type of an attribute indicated by the user, into an independent category.

7. An apparatus for retrieving a document, comprising:

a document storage for storing a plurality of documents;

document retrieving means for retrieving documents matching an indicated condition from said document storage;

a classification attribute storage for storing only types of indicated attributes, among a plurality of types of attributes that can be used to classify documents;

attribute analyzing means for analyzing each of the documents retrieved by said document retrieving means to determine which one of the types of attributes stored in said classification attribute storage an attribute element contained in the document belongs to; and attribute classifying means for classifying each of the documents retrieved by said document retrieving means into a category according to the type of the attribute element contained in the document based on the determined type of an attribute.

8. An apparatus according to claim 7, further comprising:

a candidate storage for storing the types of attributes that can be used to classify documents; and classification attribute selecting means for storing only types of attributes indicated by an administrator of the apparatus, among the types of attributes stored in said candidate storage, into said classification attribute storage.

9. An apparatus according to claim 8, wherein said attribute classifying means comprises means for classifying a retrieved document which does not contain an attribute element of the types stored in said classification attribute storage, into an independent category.

10. An apparatus for retrieving a document, comprising:
a document storage for storing a plurality of documents;
document retrieving means for retrieving documents matching an indicated condition from said document storage;
a classification attribute storage for storing only types of indicated attributes, among a plurality of types of attributes that can be used to classify documents;
attribute element extracting means for extracting an attribute element belonging to the type of an attribute indicated by a user who has made a retrieval request, among the types of attributes stored in said classification attribute storage, from each of the documents retrieved by said document retrieving means; and
attribute element classifying means for classifying each of the documents retrieved by said document retrieving means into a category according to the attribute element contained in the document based on the extracted attribute element.

11. An apparatus according to claim 10, further comprising:
a candidate storage for storing the types of attributes that can be used to classify documents; and
classification attribute selecting means for storing only types of attributes indicated by an administrator of the apparatus, among the types of tributes stored in said candidate storage, into said classification attribute storage.

12. An apparatus according to claim 11, wherein said attribute element classifying means comprises means for classifying a retrieved document which does not contain an attribute element belonging to the type of an attribute indicated by the user, into an independent category.

13. An apparatus for retrieving a document, comprising:
a document storage for storing a plurality of documents;
document retrieving means for retrieving documents matching an indicated condition from said document storage;
a classification attribute storage for storing only types of indicated attributes, among a plurality of types of attributes that can be used to classify documents;
attribute element extracting means for extracting an attribute element belonging to the type of an attribute indicated by a user who has made a retrieval request, among the types of attributes stored in said classification attribute storage, from each of the documents retrieved by said document retrieving means;
a thesaurus storage for storing words as hyperonyms of words in a hierarchical structure; and
attribute element thesaurus classifying means for classifying each of the documents retrieved by said document retrieving means into a category according to a word which is a hyperonym of the extracted attribute element contained in the document and extracted by said attribute element extracting means, and which is present at a hierarchical level indicated by a user who has made a retrieval request in said thesaurus storage.

14. An apparatus according to claim 13, further comprising:
a candidate storage for storing the types of attributes that can be used to classify documents; and
classification attribute selecting means for storing only types of attributes indicated by an administrator of the apparatus, among the types of attributes stored in said candidate storage, into said classification attribute storage.

15. An apparatus according to claim 14, wherein said attribute element thesaurus classifying means comprises means for classifying a retrieved document which does not contain an attribute element belonging to the type of an attribute indicated by the user, into an independent category.

16. A program for enabling a computer to retrieve documents, comprising the steps of:
retrieving documents matching an indicated condition from a plurality of documents;
selecting the type of an attribute for use in classifying documents from a plurality of types of attributes that can be used to classify documents, and storing the selected type of an attribute in a classification attribute storage;
analyzing each of the retrieved documents to determine which one of types of attributes stored in said classification attribute storage an attribute element contained in the document belongs to; and
classifying each of the retrieved documents into a category according to the type of the attribute element contained in the document based on the determined type of an attribute.

17. A program for enabling a computer to retrieve documents, comprising the steps of:
retrieving documents matching an indicated condition from a plurality of documents;
selecting the type of an attribute for use in classifying documents from a plurality of types of attributes that can be used to classify documents, and storing the selected type of an attribute in a classification attribute storage;
extracting an attribute element belonging to the type of an attribute indicated by a user who has made a retrieval request, among types of attributes stored in said classification attribute storage, from each of the retrieved documents; and
classifying each of the retrieved documents into a category according to the attribute element contained in the document based on the extracted attribute element.

18. A program for enabling a computer to retrieve documents, comprising the steps of:
retrieving documents matching an indicated condition from a plurality of documents;
selecting the type of an attribute for use in classifying documents from a plurality of types of attributes that can be used to classify documents, and storing the selected type of an attribute in a classification attribute storage;
extracting an attribute element belonging to the type of an attribute indicated by a user who has made a retrieval request, among types of attributes stored in said classification attribute storage, from each of the retrieved documents; and
classifying each of the retrieved documents into a category according to a word which is a hyperonym of the extracted attribute element contained in the document and which is present at a hierarchical level indicated by a user who has made a retrieval request in a thesaurus of words contained as hyperonyms of words and arranged in a hierarchical structure.

* * * * *